(12) United States Patent
Logvinov et al.

(10) Patent No.: US 11,462,932 B2
(45) Date of Patent: Oct. 4, 2022

(54) METHOD AND APPARATUS FOR CHARGING A BATTERY WITH AC POWER BASED ON STATE OF BATTERY RELATED INFORMATION

(71) Applicant: IoTecha Corp., Cranbury, NJ (US)

(72) Inventors: Oleg Logvinov, Jersey City, NJ (US); Michael J. Macaluso, Jackson, NJ (US)

(73) Assignee: IoTecha Corp., Cranbury, NJ (US)

( * ) Notice: Subject to any disclaimer, the term of this patent is extended or adjusted under 35 U.S.C. 154(b) by 168 days.

(21) Appl. No.: 16/963,899

(22) PCT Filed: Jan. 22, 2019

(86) PCT No.: PCT/US2019/014519
§ 371 (c)(1),
(2) Date: Jul. 22, 2020

(87) PCT Pub. No.: WO2019/147557
PCT Pub. Date: Aug. 1, 2019

(65) Prior Publication Data
US 2021/0046839 A1 Feb. 18, 2021

Related U.S. Application Data

(60) Provisional application No. 62/620,815, filed on Jan. 23, 2018.

(51) Int. Cl.
*H02J 7/00* (2006.01)
*H02J 7/02* (2016.01)
(Continued)

(52) U.S. Cl.
CPC .............. *H02J 7/02* (2013.01); *B60L 53/305* (2019.02); *B60L 53/63* (2019.02); *B60L 53/65* (2019.02);
(Continued)

(58) Field of Classification Search
CPC ........ B60L 53/63; B60L 53/305; B60L 53/65; B60L 53/665; B60L 58/12; B60L 58/18;
(Continued)

(56) References Cited

U.S. PATENT DOCUMENTS 5,179,335 A 1/1993 Nor
9,026,347 B2 5/2015 Gadh et al.
(Continued)

OTHER PUBLICATIONS

International Search Report including the Written Opinion from Application No. PCT/US19/14519 dated Jun. 20, 2019, 2 pages.
(Continued)

*Primary Examiner* — Paul Dinh
(74) *Attorney, Agent, or Firm* — NK Patent Law

(57) ABSTRACT

Technology for charging at least one battery is described. An aspect of the technology involves charging a battery using alternating current (AC) power by periodically stopping (602) charging of a battery of a mobile energy storage and power consumption device (16A) with AC power, and when charging of the battery with AC power is stopped, initiating (604) a direct current (DC) power charging communications cycle for the battery, in which the initiating the DC power charging communications cycle includes obtaining (606) state of battery related information for the battery by transmitting, over a communication link or interface, a request signal to a charging control device at the mobile energy storage and power consumption device indicating DC power charging mode of operation.

20 Claims, 4 Drawing Sheets

(51) Int. Cl.
  *B60L 58/18* (2019.01)
  *B60L 58/12* (2019.01)
  *B60L 53/30* (2019.01)
  *B60L 53/66* (2019.01)
  *B60L 53/63* (2019.01)
  *B60L 53/65* (2019.01)

(52) U.S. Cl.
  CPC ............ *B60L 53/665* (2019.02); *B60L 58/12* (2019.02); *B60L 58/18* (2019.02); *H02J 7/00034* (2020.01); *H02J 7/0048* (2020.01); *H02J 7/00711* (2020.01); *H02J 7/00712* (2020.01); *B60L 2240/72* (2013.01); *B60L 2260/54* (2013.01); *H02J 2207/40* (2020.01); *H02J 2310/48* (2020.01)

(58) Field of Classification Search
  CPC .... B60L 2240/72; B60L 2260/54; H02J 7/02; H02J 2207/40; H02J 7/00711; H02J 7/0031; H02J 7/00034; H02J 2310/48; H02J 7/00712; H02J 7/0048; Y02T 10/70; Y02T 10/7072; Y02T 90/12; Y02T 90/16

USPC ....................................................... 320/109
  See application file for complete search history.

(56) References Cited

U.S. PATENT DOCUMENTS

| | | |
|---|---|---|
| 9,225,192 B2 | 12/2015 | Lee et al. |
| 2012/0233077 A1 | 9/2012 | Tate, Jr. et al. |
| 2014/0285146 A1 | 9/2014 | Huston et al. |
| 2015/0130414 A1* | 5/2015 | Izumi .................... H02J 7/02 320/109 |
| 2016/0090001 A1* | 3/2016 | Nomoto .................... B60L 7/18 320/109 |
| 2016/0204625 A1 | 7/2016 | Josephs et al. |

OTHER PUBLICATIONS

EPO, Extended European Search Report for corresponding European Patent Application No. 19744193.4, dated Feb. 1, 2022, 9 pages.

CIPO, Office Action for corresponding Canadian Patent Application No. 3,089,472, dated May 19, 2022, 4 pages.

* cited by examiner

METHOD AND APPARATUS FOR CHARGING A BATTERY WITH AC POWER BASED ON STATE OF BATTERY RELATED INFORMATION

CROSS-REFERENCE TO RELATED APPLICATION

The present application is a national phase entry under 35 U.S.C. § 371 of International Application No. PCT/US2019/014519 filed Jan. 22, 2019, published in English, which claims priority from U.S. Provisional Application No. 62/620,815, filed on Jan. 23, 2018, all of which are incorporated herein by reference.

TECHNICAL FIELD

The present disclosure generally relates to electric battery charging systems, and more particularly, to intelligently charging a battery with AC power based on state of battery related information.

BACKGROUND

With the expected increase in the number of EVs in the near future, electric power charging requirements likely will increase. As a result, the existing electric power grid infrastructure, which includes utility power grids, distribution power grids and power grids at a residential or commercial level, may face challenges to satisfy the increased charging requirements.

The automotive industry has standardized a variety of charging methods for EVs. These methods include AC and DC charging methods. DC charging may provide for much faster charging than AC charging, but is more complex than AC charging in that DC charging requires exchange of more power and charging control related information between a DC charger and the battery than for AC charging. In particular, in DC charging, information such as current state of charge of the battery and type of battery or EV is obtained by the DC charging apparatus from a charging controller in the EV, which is configured to perform so-called intelligent communications in connection with AC charging mode using, for example, DIN70121 or ISO/IEC 15118. The DC charging apparatus uses the state of charge information and EV or battery identification information to control DC power supply to the battery of the EV, for example, to avoid damaging the battery by overcharging.

AC charging apparatuses currently are more prevalent than DC charging apparatuses in many countries. AC charging, however, has a limited ability to charge a battery quickly due to power limits. In addition, most EVs do not include a controller configured to perform intelligent communications with an AC charging apparatus as part of AC charging mode operation, such that an AC charging apparatus cannot obtain, for example, state of charge, user preferences such as departure time, and vehicle identification information from the EV in connection with AC charging operations.

Accordingly, there exists a need for method, apparatus and system for intelligently charging a battery of a mobile energy storage and power consumption apparatus, such as an EV, by AC power, efficiently and cost effectively.

SUMMARY

In accordance with the present disclosure, a method for charging at least one battery using alternating current (AC) power may include: controlling, by a processing device, periodically stopping charging of a first battery of a first mobile energy storage and power consumption device with AC power; and when charging of the first battery with AC power is stopped, initiating a direct current (DC) power charging communications cycle for the first battery, in which the initiating the DC power charging communications cycle includes obtaining first state of battery related information for the first battery by transmitting, over a communication link or interface, a request signal to a charging control device at the first mobile energy storage and power consumption device indicating DC power charging mode of operation.

In accordance with the present disclosure, a method for charging at least one battery may include controlling, by a processing device, determining an amount of energy consumable from a power grid based on a state of charge and a power charging function for a battery of at least one mobile energy storage and power consumption device as an electric vehicle (EV); and when the power grid is determined to be in an inversion state having excess energy available, supplying power from the grid to charge the battery of the at least one EV to consume at least a portion of the excess energy.

In accordance with the present disclosure, a method for charging a plurality of batteries of a respective plurality of electric vehicles (EVs), may include controlling, by a processing device, transmitting, over a communication network, to control devices respectively of the EVs which are detected as connected to EV charging apparatuses, cost information for charging by the EV charging apparatuses using energy from a microgrid; based on user charging activity information received, over the communication network, indicating charging activity at the respective EV charging apparatuses following transmission of the cost information, determining user charging preferences for the respective EVs; and determining a charging schedule for at least a first EV of the EVs based on first user charging preference of the user charging preferences.

In accordance with the present disclosure, a method for charging a plurality of batteries of respective plurality of electric vehicles (EVs), may include: controlling, by a processing device, generating charging pricing information for each first EV of the EVs connected with a predetermined microgrid or segment of a power gird via a respective EV charging apparatus, based on battery characteristics of the battery, state of battery related information and power charging function of the battery of the each first EV and information indicating at least one of availability of local energy storage, availability of a local renewable energy source, pricing for energy supply from a power grid, availability for energy supply from the power grid, a learned pattern of charging for the each first EV or energy availability at the each first EV, such that predetermined available energy is distributed according to optimization criteria from an available energy source for charging the each first EV; wherein the state of battery related information and the power charging function for the each first EV is determined by the processing device controlling: periodically stopping charging of the battery of the each first EV with AC power; and when charging of the battery of the each first EV with AC power is stopped, initiating a direct current (DC) power charging communications cycle for the battery of the each first EV, in which the initiating the DC power charging communications cycle includes obtaining the state of battery related information for the battery of the each first EV by transmitting, over a communication link or interface, a request signal to a charging control device at the each first EV indicating DC power charging mode of operation.

BRIEF DESCRIPTION OF THE DRAWINGS

The foregoing aspects, features and advantages of the present disclosure will be further appreciated when considered with reference to the following description of exemplary embodiments and accompanying drawings, wherein like reference numerals represent like elements. In describing the exemplary embodiments of the present disclosure illustrated in the drawings, specific terminology may be used for the sake of clarity. However, the aspects of the present disclosure are not intended to be limited to the specific terms used.

DETAILED DESCRIPTION

Overview

Figure 1:
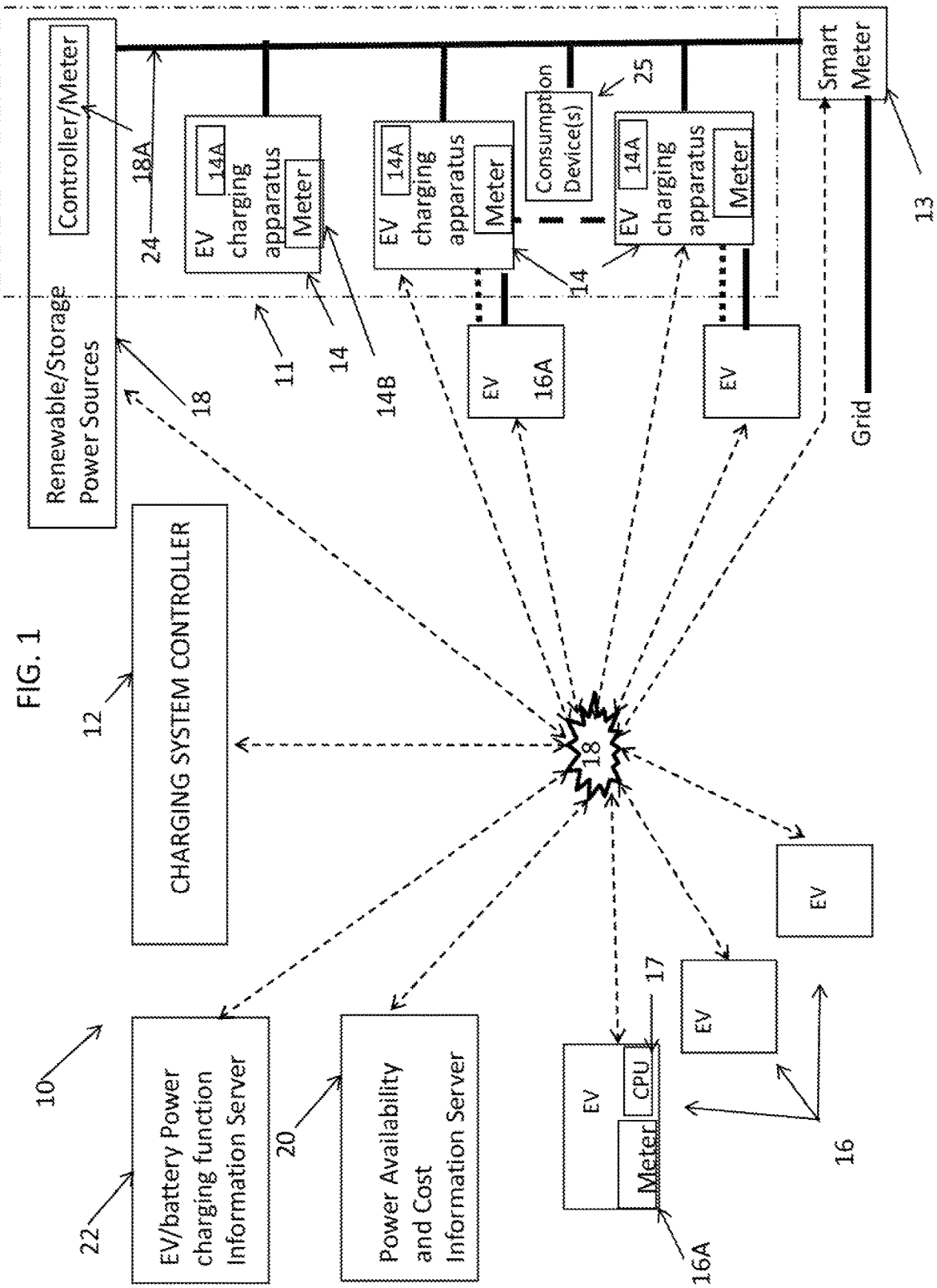
FIG. 1 is a block diagram of an exemplary charging control system, in accordance with aspects of the present disclosure.

The technology of the present disclosure relates to, by way of example, a charging system controller and method for controlling charging a battery of one or more mobile energy storage and power consumption apparatuses, such as EVs, according to state of battery related information obtained from the EV during charging operations. The state of battery related information may be obtained in connection with AC power charging from EV controllers that do not include intelligent communication capabilities for AC charging, by indicating initiation of a DC power charging communications cycle to the EV controller, which does not start a DC charging cycle but starts communication to notify of a desire to start a DC power charging cycle or session, and which in turn may cause the EV controller to communicate desired state of battery related information to the EV charging apparatus. The state of battery of related information, which may be periodically obtained, may be used to determine a power charging function for the battery (EV), and a power charging schedule for the EV may be determined based on the power charging function and the state of battery related information, in particular current battery state of charge information, that optimizes distribution of energy to one or more EVs, such as in a power-constrained application of a local power grid ("microgrid") which is isolatable from a power grid. For ease of reference and as used in the present disclosure, "local" refers to a low voltage transformer and any power equipment connected to a secondary winding of the transformer, i.e., load side, and "power grid" or "grid" is an electrical power network of an electrical utility upstream of the low voltage transformer. The power charging schedule may be determined also based on (i) electric power consumption, energy storage and energy generation related information from controllers associated with power consumption devices, charging apparatuses and alternative power resources, such as a Distributed Energy Resource (DER), Renewable Energy Resource ("Renewable") and an energy storage system, on the microgrid; (ii) transactive energy information, such as from a transactive energy market; (iii) information from Internet of Things (IoT) devices associated with users or others devices that may impact consumption of power on the microgrid; and (iv) information related to energy generation and power supply on the grid to which the microgrid may be selectively connected and disconnected.

In the present disclosure below, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with EV charging and an EV charging system have not been shown or described in detail to avoid unnecessarily obscuring descriptions of the embodiments.

Embodiments of the present disclosure are described generally with respect to a charging system controller, which may be employed in commercial, industrial, residential and other settings for charging a battery. Although the present disclosure uses EV battery charging as an example, it is to be understood that the aspects of the present disclosure may apply to any energy storage device such as capacitors; any electrical power source such as DERs, Renewables and EVs, as well as to other applications such as electric airplanes, electric motorcycles and the like so on.

In accordance with an aspect of the present disclosure, power management services may be provided to a power grid based on a determination that an inversion event, where excess energy is available that cannot be supplied to be grid because such excess amount of energy if supplied to the grid would result in power on the grid exceeding the maximum power capabilities of the grid, is occurring or will occur. When an inversion event is determined, power may be supplied from the grid to charge one or more EVs during the inversion event so as to consume the excess energy, according to current state of charge and a power charging function obtained for the EVs. In some embodiments, the state of battery related information obtained from the indication of initiation of DC mode charging may be used to acquire the current state of charge and determine a power charging function for the EVs.

In accordance with an aspect of the present disclosure, pricing information for supply of energy from a local grid, which may include alternative power resources such as a DER, an energy storage system and Renewable, may be communicated to an EV and information describing user charging activity at an EV, which occurs subsequent to communication of the pricing information, may be obtained and used to determine EV user charging preferences. From the obtained information, charging schedules according to EV user charging preferences may be determined, where the charging schedules may be determined so as to optimize distribution of energy from the grid or alternative sources on the microgrid.

In accordance with an aspect of the present disclosure, EV specific charging pricing information may be determined for charging EVs from a segment of the grid, such as microgrid, to optimize energy distribution therefrom, based on characteristics of the battery, state of battery related information and power charging function of the battery of the EVs and information indicating at least one of availability of local energy storage, availability of a local renewable energy source, pricing for energy supply from a power grid, availability for energy supply from the power grid, learned patterns of charging for the each first EV or any other information related energy availability.

Example Systems

FIG. 1 illustrates a block diagram of an exemplary charging control system 10 which may include a charging system controller 12 configured to control charging of batteries of respective EVs by EV charging apparatuses using AC power from a microgrid 11, based on state of battery related information obtained from the EVs, according to an aspect of the present disclosure. For purposes of describing an embodiment of the present disclosure, some of the EVs to be charged are configured without intelligent communication capabilities for use in connection with AC power charging, and according to an embodiment of the present disclosure, a communication signal may be sent to such EVs with an indication of initiation of a DC power charging communications cycle which notifies of an intention to start a DC power charging cycle or session but does not start the DC power charging cycle, to obtain desired state of battery related information from such EVs for use in charging with AC power, to optimize energy distribution from energy sources having energy available for supply on the microgrid 11. In some embodiments, the microgrid may cover a suburb/neighborhood, rural district, university or large office campus, etc., and rely on local DER on the microgrid for satisfying power consumption requirements on the microgrid.

Referring to FIG. 1, the system 10 may include, in addition to the charging system controller 12, a smart meter 13 connecting the grid with a low voltage power line 24 of the microgrid 11, EV charging apparatuses 14 including respective controllers 14A and meters 14B, an alternative power resource 18 including one or more of a DER, an energy storage system and a Renewable each having a controller and meter 18A, a Power Availability and Cost Information Server 20, an EV/battery power charging function information server 22, and a communication network 18.

The grid may be coupled via a local transformer and powerline customer premise distribution wiring (not shown) to the smart meter 13, which may be coupled to the low voltage powerline 24. The powerline 24 may extend to EV charging apparatuses 14 and the alternative power resource 18. In addition, each EV charging apparatus 14 may include a power interface and a communication interface (not shown) for coupling to corresponding interfaces of an EV 16, and a power interface (not shown) for coupling to the powerline 24. Additional power consumption devices 25 may be coupled to and consume power supplied from the powerline 24. The communication network 18 may communicatively couple the controller 12, the alternative resource controller 18A, the smart meter 13, the servers 20 and 22, controllers respectively of the EV charging apparatuses 14, and optionally controllers of the EVs and consumption devices 25 with one another.

Figure 2:
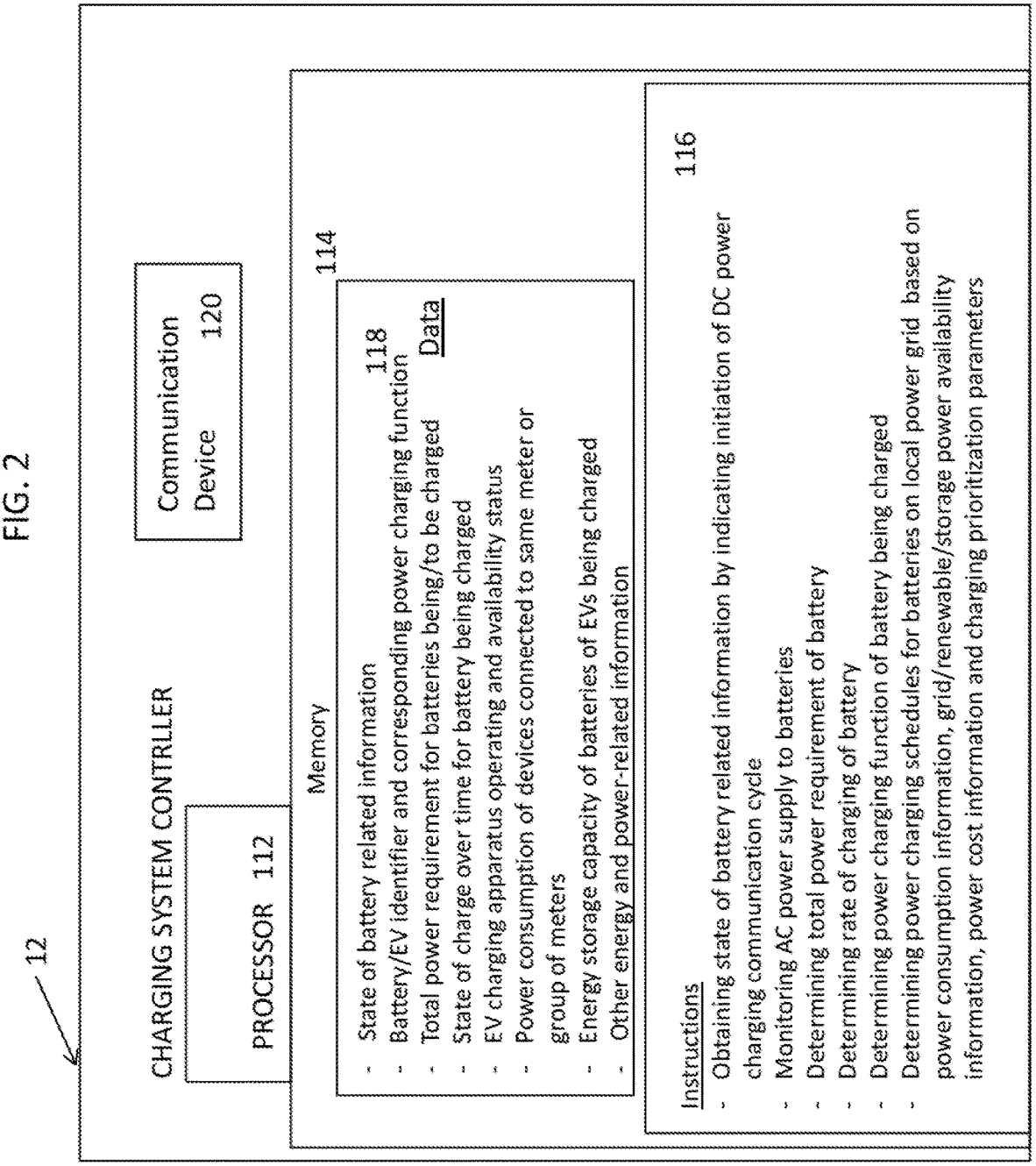
FIG. 2 is an illustration of a block diagram of an exemplary power system controller of FIG. 1, in accordance with aspects of the present disclosure.

FIG. 2 illustrates an exemplary embodiment of the charging system controller 12, which may be in the form of a computing device that includes one or more processors 112, one or more memory 114, and other components commonly found in computing devices.

The memory 114 may store information accessible by the one or more processors 112, including instructions 116 that may be executed by the one or more processors 112. Memory may also include data 118 that can be stored, manipulated, or retrieved by the processor. Such data 118 may also be used for executing the instructions 116 and/or for performing other functions. Such memory may be any type of non-transitory media readable by the one or more processors, such as a hard-drive, solid state hard-drive, memory card, ROM, RAM, DVD, CD-ROM, write-capable, read-only memories, etc.

The instructions 116 may be any set of instructions capable of being read and executed by the one or more processors 112. The instructions may be stored in a location separate from the computing device, such as in a network attached storage drive, or locally at the computing device. The terms "instructions," "functions," "application," "steps," and "programs" may be used interchangeably herein.

Data 118 may be stored, retrieved and/or modified by the one or more processors 112 in accordance with the instructions 116. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the controller 12 may include a communication device 120 configured to provide wired or wireless communication capabilities.

The one or more processors 112 may be any type of processor, or more than one type of processor. For example, the one or more processors 112 may be CPUs from Intel, AMD, and Apple, or application specific integrated circuits (ASIC) or system on chips (SoCs).

FIG. 2 illustrates the components of the controller 12 as being single components, however, the components may actually comprise multiple processors, computers, computing devices, or memories that may or may not be stored within the same physical housing. For example, the memory may be a hard drive or other storage media located in housings different from that of the controller 12. Accordingly, references to a processor, computer, computing device, or memory herein will be understood to include references to a collection of processors, computers, computing devices, or memories that may or may not operate in parallel. Further, although some functions described below are indicated as taking place on a single computing device having a single processor, various aspects of the subject matter described herein may be implemented by a plurality of computing devices in series or in parallel.

Referring to FIG. 2, the controller 12 may be configured to provide specific functions in accordance with embodiments of the present disclosure, and in some embodiments may be programmed with programs to perform some or all of the operations described herein. In some embodiments the controller 12 may be programmed to store, in the memory 114, state of battery related information obtained from an EV controller in circumstances of initiation of a DC charging communications cycle. The state of battery related information may include current state of charge of the battery, time when a current state of charge is measured at the battery, information identifying the battery, model or year of the EV containing the battery, Media Access Control (MAC) address of the EV controller used in connection with communicating any battery or EV related information from the EV to the EV charging apparatus. Also, the controller 12 may be programmed to store, in the memory 114, information indicating a total power requirement for each battery of each EV being or scheduled to be charged by an EV charging apparatus, a power charging curve or function for a battery, vehicle or battery identification information including power charging function information for respective EVs or batteries obtained from a third party database, EV charging apparatus operating and availability status information, information indicating power consumption of devices connected to the microgrid, for example, through a same meter or group of meters, and energy storage capacity of batteries of EVs being charged. Further, the controller 12 may be programmed to store, in the memory 114, any other energy and power-related information related to EV charging including transactive energy data received from the server 20, charging request and user charging preference information received from a EV controller including user charging activity information indicating changes in EV charging for a specific EV responsive to charging pricing information provided to the EV user, sensor information indicating power consumption at consumption devices, and other energy and power related data that may be received from a component external to the system 10, such as over the network 18 or power lines of the grid.

In addition, the controller 12 may store, in the memory 114, instructions 116 for controlling obtaining state of battery related information by indicating initiation of a DC power charging communications cycle; monitoring AC power supply to batteries of respective EVs from the microgrid; and determining, from state of battery related information including state of battery charge for different respective times or battery or EV identification, a power charging function, a total power requirement, or rate of charging of battery. In addition, the instructions 116 may include determining power charging schedules for batteries of EVs from power on the local power grid based on power consumption information for the microgrid, information on availability of energy from the grid, renewable energy resource or storage information, power cost information and charging prioritization conditions. Further, the instructions 116 may include determining a battery or EV identifier based on power factor information indicating capacitive and inductive data measured during EV charging obtained from an EV charging apparatus, EV user activity information or other battery state related information. In addition, the instructions may include storing in a database a power charging function determined for a given EV, desirably identified by an identifier of the battery or the EV when the identification is made, for example, based on user provided data or by correlation with other power charging function data for respective batteries or EVs obtained, for example, from the server 20. In addition, the instructions may include determining a power charging schedule to control supply of excess energy from the grid available during a power inversion event by charging the batteries of EVs during the inversion event, according to state of charge and a power charging function for an EV battery.

Further, the instructions may include learning EV user preferences for charging, by providing local charging pricing information to the EV user and monitoring EV user activity in response to the pricing information.

Also, the instructions may include generating EV specific pricing information based on state of charge and power charging function and any available information on power availability, consumption and pricing, to provide for distribution of energy optimally.

It is to be understood that each of the smart meter 13, controller 18A, controller 17 of each EV 16, servers 20 and 22, controllers 14A of the EV charging apparatuses and controller of the consumption devices 25 may be configured in the form of respective computing devices similar to the controller 12, and include one or more processors, memory and instructions as described above. Each computing device may be a personal computing device, such as intended for use by a user, and have all of the components normally used in connection with a personal computing device such as a central processing unit (CPU), memory (e.g., RAM and internal hard drives) storing data and instructions, a display (e.g., a monitor having a screen, a touch-screen, a projector, a television, or other device that is operable to display information), and a user input device (e.g., a mouse, keyboard, touch-screen, or microphone). Although not shown, the controller 12 may also include a display and a user input device.

Although each computing device for the present disclosure may comprise a full-sized personal computing device, each computing device may alternatively comprise a mobile computing device capable of wirelessly exchanging data with a server, such as the controller 12, over a network, such as the Internet. By way of example only, a computing device may be a mobile phone or a wireless device such as a wireless-enabled PDA, a tablet PC, a netbook or an IoT device. In another example, a computing device may be a laptop computer.

Referring again to FIG. 1, each of the controllers 18A, controllers of EVs 16, controllers 14A of apparatuses 14, controllers of the consumption devices 25 and controller 12 may be communicatively connected with each other via the network 18, and/or may be directly connected to each other. The network 18 may include interconnected protocols and systems. For example, the network 18 may be implemented via the Internet, intranets, local area networks (LAN), wide area networks (WAN), etc. Communication protocols such as Ethernet, Wi-Fi, and HTTP, Bluetooth, LTE, 3G, 4G, Edge, etc., and various combinations of the foregoing may be used to allow nodes to communicate. In one embodiment, IoT protocols may be used to allow interconnection of IoT devices associated with consumption devices (not shown) supplied power from the microgrid 11 with another controller of the system 10. In another embodiment, the network 18 may also include peer-to-peer wiring.

Each of the controllers 18A, controllers of EVs 16, controllers 14A of apparatuses 14, controllers of the consumption devices 25 and controller 12 may be implemented by directly and/or indirectly communicating over the network 18. In this regard, each of the controllers 18A, controllers of EVs 16, controllers 14A of apparatuses 14, controllers of the consumption devices 25 and controller 12 may be at different nodes of the network 18 and capable of directly and indirectly communicating with other nodes of the network 18. As an example, each of the controllers 18A, controllers of EVs 16, controllers 14A of apparatuses 14, controllers of the consumption devices 25 and controller 12 may include web servers capable of communicating with another computing device via the network 18, and with a computing device external to the system 10 via the network 18. For example, the controller 12 may use the network 18 to transmit and present information to a user, such as a user of an EV, on a display, such as displays respectively of controllers 14A.

In one embodiment, the smart meter 13 may be a power control device capable of measuring and controlling or helping to control, through messaging and signaling means, energy consumption (grid to load of the microgrid 11) and energy generation (load of the microgrid 11 to the grid), and may communicate with other components of the system 10 to receive energy and power related information. In addition, the smart meter 13 may operate to selectively connect the microgrid 11 to the grid and disconnect (isolate) the microgrid 11 from the grid, for example, under control of the controller 12. In one embodiment, the microgrid 11 may provide power service to a single or multiple facilities, such as houses or buildings.

The alternative power resource 18 may include a DER and/or a Renewable that may generate energy and output electrical power based on the generated energy. In addition, the controllers 18A may control transmitting energy generation and power output related information to the controller 12; receiving control information from the system controller 12 for controlling the output of power therefrom; and managing, based on the control information, output of power to the microgrid 11 from the energy generated.

The alternative power resource alternatively or also may include a storage system that stores energy which may be used to output electrical power. In addition, the controller 18A may control transmission of energy storage and power output information to the system controller 12; receiving control information from the system controller 12 for controlling storage of energy, such as from power output on the microgrid 11 based on energy from a DER or Renewable (not shown); and receiving control information from the controller 12 for controlling output of power to the microgrid 11 based on the stored energy.

The Power Availability and Cost Information Server 20 may be a computing device that receives and transmits electricity (energy) market transactive energy information, such as a clearing price for electrical power supply, and also other transactive energy information, such as related to a transactive energy model.

The EV/battery Power charging function information server 22 may be a computing device having communication capabilities and store battery or EV identification information and battery profile information, such as a power charging function, identified as corresponding to a battery or EV identifier included in the battery or EV identification information. The battery profile information may describe as the power charging function for a battery charging characteristics of the battery indicating an amount of AC or DC current that the battery permits to be used to charge the battery over time and particular states of charge of the battery in relation to completely discharged and fully charged states of the battery over time. The battery profile information may include rate of charging for specific intervals of battery charging, for example, between 0-80% charge state, 81-90% charge state, and 91-100% charge state. The EV identifier may include type, model or year of the EV in which a battery is installed. In addition, the server 22 may be coupled to other servers (not shown) which provide EV/battery power charging function information, such as EV and/or battery manufacturer servers. The server 22 may transmit to, and also receive from, the controller 12, EV/battery power charging function information.

Figure 3:
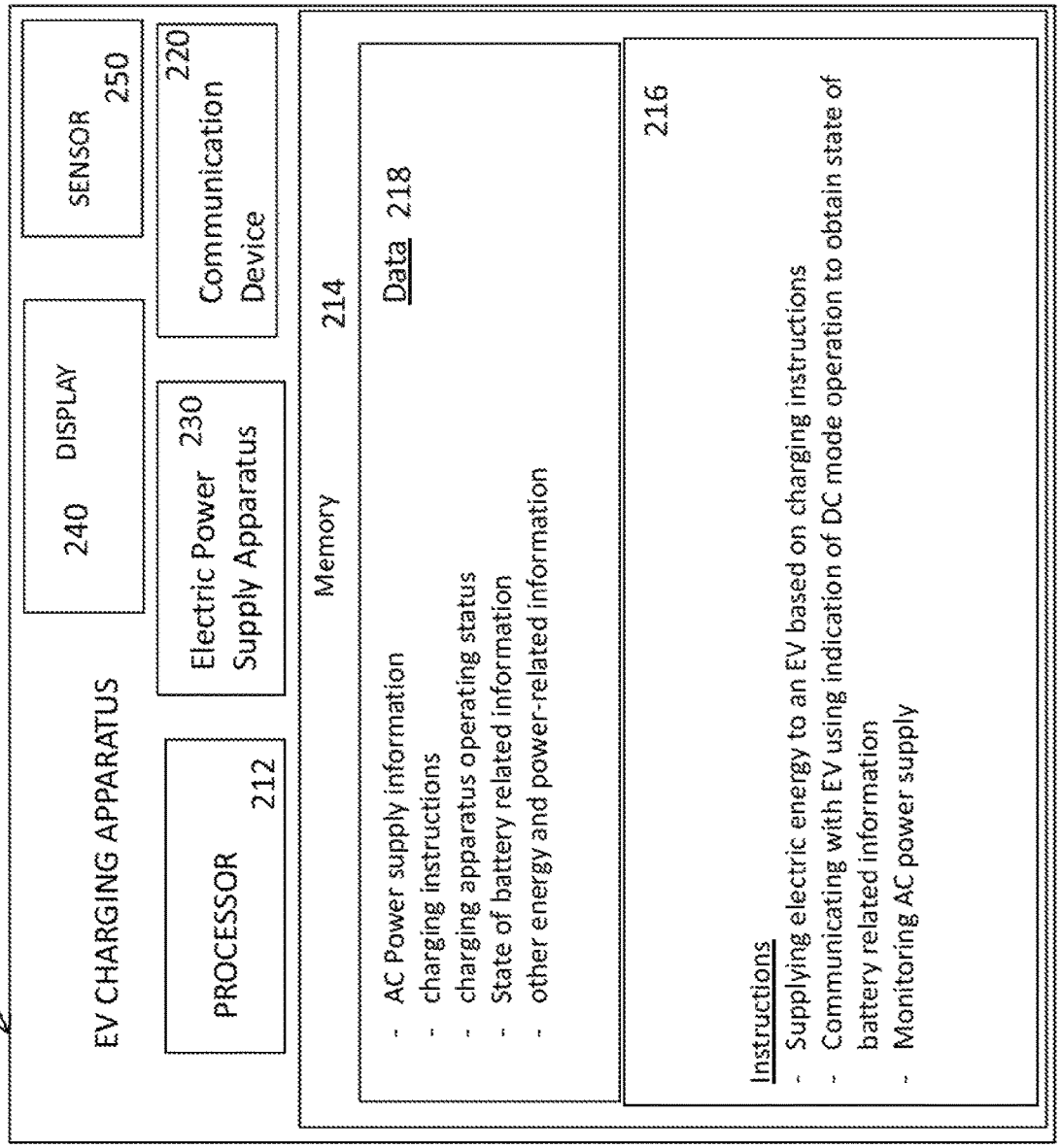
FIG. 3 is an illustration of a block diagram of an exemplary EV charging apparatus of FIG. 1, in accordance with aspects of the present disclosure.

FIG. 3 illustrates an exemplary embodiment of an EV charging apparatus 14. The apparatus 14 may include a component that is in the form of a computing device which includes one or more processors 212, one or more memory 214, and other components commonly found in computing devices. For ease of reference, the computing device of an EV charging apparatus is referred to herein as "EV charging controller." The apparatus 14 may be a personal computing device, such as intended for use by a user, and have all of the components normally used in connection with a personal computing device such as a central processing unit (CPU), memory (e.g., RAM and internal hard drives) storing data and instructions.

The memory 214 may store information accessible by the one or more processors 212, including instructions 216 that may be executed by the one or more processors 212. Memory may also include data 218 that can be stored, manipulated, or retrieved by the processor. Such data may be stored in one or more formats or structures, such as in a relational or non-relational database, in a SQL database, as a table having many different fields and records, XLS, TXT, or XML documents. The data may also be formatted in any computing device-readable format. In some embodiments the data may be encrypted. In addition, the apparatus 14 may include a communication device 220 configured to provide wired or wireless communication capabilities. The one or more processors 212 may be any type of processor, or more than one type of processor. For example, the one or more processors 212 may be CPUs from Intel, AMD, and Apple, or application specific integrated circuits (ASIC) or system on chips (SoCs).

The EV charging apparatus 14 may be configured to provide specific functions in accordance with embodiments of the present disclosure, and in some embodiments may be programmed with programs to perform some or all of the operations described herein. In some embodiments the processor 212 may be programmed to store, in the memory 214, AC Power supply information indicating an amount of current supplied over time to charge an EV, charging instructions for charging an EV, information indicating charging apparatus operating status, state of battery related information and any other energy and power-related information, as suitable.

Also, the apparatus 14 may be programmed to store, in the memory 214, instructions 216 for controlling: supplying electric energy to an EV based on a charging instruction, which may include periodically stopping charging with AC power, initiating a DC charging communications cycle operation, communicating with a controller of an EV to indicate DC mode operation has been initiated which includes transmitting a request signal to obtain state of battery related information from the controller of the EV; receiving a charging instruction indicating a charging schedule for charging an EV; supplying electric energy as AC power or optionally DC power to charge an EV according to the charging schedule; and monitoring an amount of AC power, for example, current level, supplied over time to an EV.

Further, the apparatus 14 may include an electric power supply apparatus 230 which include an AC charger and optionally also a DC charger as a power interface, a display 240 and a sensor device 250, each controllable by the processor 212. The electric power supply apparatus 230 may include electrical power components for supplying electrical energy, such as in the form of AC or DC current, from an electric power source, to an EV via an electric power cable of apparatus 230 which is for connecting with an electrical power interface at the EV. The sources of electric power may include alternative energy or renewable power resources, or a storage system that stores energy which may be used to output electrical power.

The display 240 may be a monitor having a screen, a touch-screen, a projector, a television, or other device that is operable to display information. In addition, the apparatus 14 may include (not shown) a user input device (e.g., a mouse, keyboard, or microphone).

The sensor device 250 may include a camera, proximity sensor, an outdoor environmental condition sensor, such as sensing temperature, windspeed, etc., or an energy meter, and generate sensor information representative of a sensed parameter.

In one embodiment, a sensor device similar to the sensor device 250 may be included in a consumption device 25, which may include a computing device and communication capabilities, as described above, that transmits, over the network 18, sensor information obtained at the device 25 to the controller 12.

In accordance with aspects of the present disclosure, any of the processing devices of the EV charging apparatuses may be configured to perform all or a portion of the methods described as the functions of the controller 12.

In accordance with one aspect of the present disclosure, the controller or CPU 17 of an EV 16 may include a mobile app which a user of the EV may configure to allow access, by the controller 12, to various preferences, calendar, location, etc. In addition, the mobile app may communicate with the controller 12, or controllers 14A at the EV charging apparatuses 14, via the network 18, to receive notifications, for example, on charger availability and other power charging services. The mobile app may also be configured to learn the EV user's driving routes, favorite or preferred EV charging apparatuses and energy usage behavior while the user at home, and communicate such information to the controller 12. In one embodiment, any of the above-indicated or similar energy and power related information collected or generated by the mobile app at the controller of an EV may be automatically transmitted as EV power-related information over the communication network 18 to the controller 12.

In accordance with aspects of the present disclosure, any of the controller 18A, the smart meter 13, controller 14A and a computing device external to the system 200, may be configured to perform all or a portion of the methods described herein, including all of the functions of the controller 12. For example, one or more computing devices, such as cloud computing device, may be configured to provide specific functions in accordance with embodiments of the technology. In this regard, one or more computing devices may maintain one or more storage devices on which energy and power related data as well as other additional data used to control charging of a battery of an EV from the microgrid 11, and to determine a power charging schedule for charging the battery of the EV 16 from the microgrid 11, may be stored.

Referring to FIG. 1, it is to be understood that the system 10 may include any number of communicatively connected computing devices as controllers of respective power consumption, energy generation and energy storage components of the system 10, with each different computing device being at a different node of the network 18.

In accordance with an aspect of the present disclosure, the controller 12 may perform processing to obtain state of battery related information when performing AC power charging of an EV, by having the controller of the EV provide the state of battery related information responsive to a notification from the EV charging apparatus that a DC charging communications cycle at the EV charging apparatus is initiated, and use the state of battery related information to determine a power charging function for the EV's battery, and control charging of the EV, and also other EVs, according to a power charging scheduled that is based on the power charging function and current state of charge of the EV battery, and also other available energy and power related information, where the power charging schedule is determined to optimize energy distribution from the microgrid while satisfying the charging requirements of EVs, which include EV user convenience, and also providing for cost efficiency in charging, and power grid management and load balancing.

Example Methods

For purposes of illustrating the features of the present disclosure, an exemplary process for determining a power charging function for charging a battery of an EV 16 with AC power from energy of a microgrid, such as the microgrid 11 of the system 10 as shown in FIG. 1, to optimize energy distribution to the EV, other EVs and any other power consumption devices on the microgrid 11, is described below in connection with operations performed at components of the power system controller 12.

Figure 4:
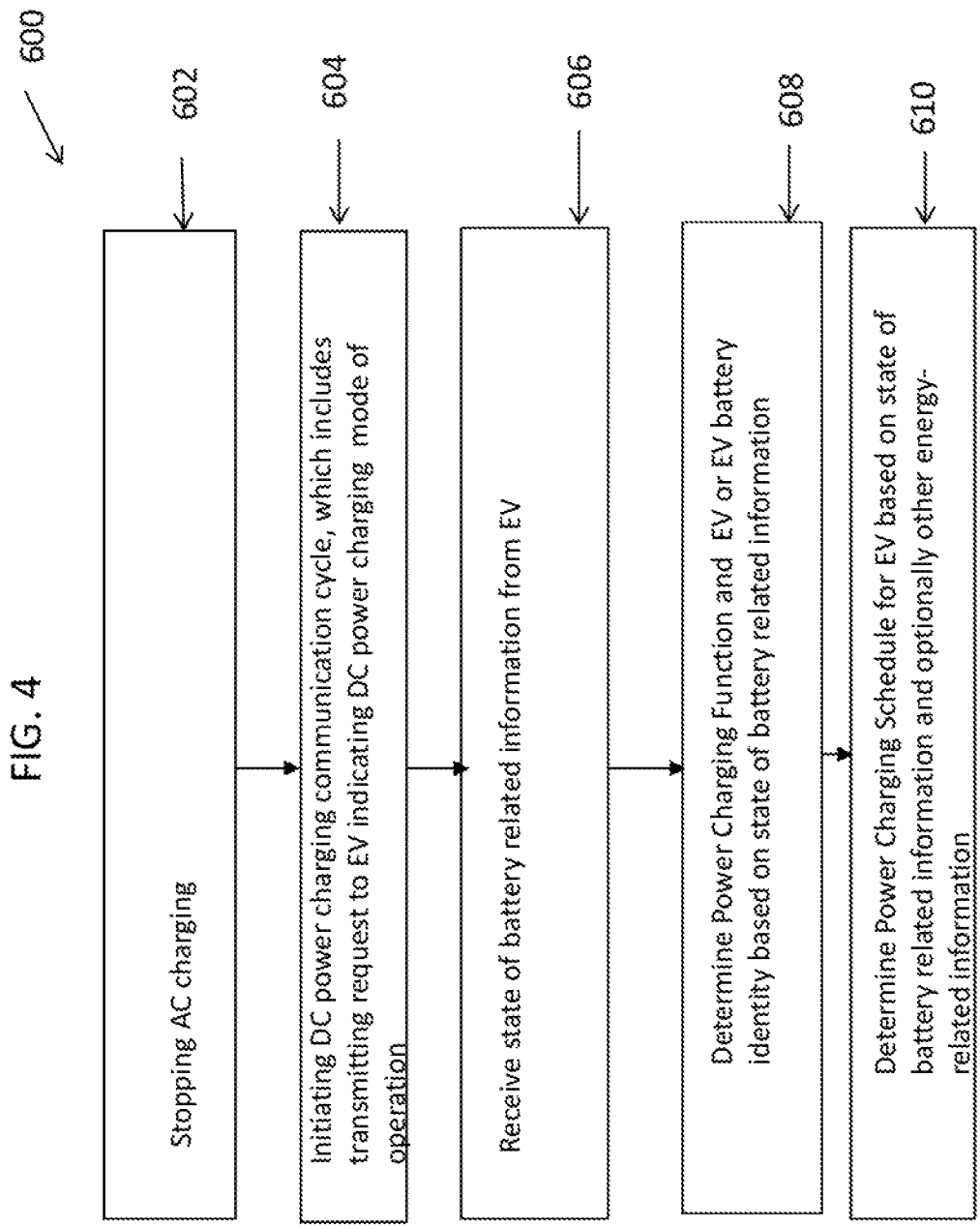
FIG. 4 is an exemplary high level flow diagram of a method for charging a battery of an EV, in accordance with aspects of the present disclosure.

Referring to FIG. 4, a high-level block diagram 600 of a method for charging a battery of an EV 16A with AC power using energy from the microgrid 11 of the system 10 is illustrated. For ease of reference, charging of the battery of the EV 16A is referred to below simply as charging the EV 16A.

Referring to FIG. 1, for purposes of illustrating an exemplary embodiment of the disclosure, an EV 16A having a configured that does not include intelligent communication capabilities in connection with AC charging, has requested charging of the battery thereof. In addition, an EV charging apparatus 14 which is designated to charge the EV 16A with AC power, may be ready to begin or has commenced an AC charging cycle. In block 602, the controller 12, at a predetermined time, such before or during the AC charging cycle, may transmit a control instruction, via the network 18, to the apparatus 14 to stop charging of the battery of the EV 16A with AC power from the apparatus. The apparatus 14, as suitable, responsive to the control instruction, may stop AC charging of the EV 16A.

In block 604, the controller 12, also at or about the predetermined time when the stop AC charging control instruction is transmitted, may transmit another control instruction, via the network 18, to the apparatus 14, indicating performance of a DC power charging communications cycle is initiated. According to the present disclosure, DC power actually would not be supplied from the apparatus 14 to the EV 16A when the DC power charging cycle is initiated. When the DC power charging communications cycle is initiated, the EV charging controller 14A transmits, over the communication interface with the EV 16A, a request signal to the controller of the EV 16A indicating DC power charging mode of operation is initiated.

In block 606, the controller of the EV 16A, responsive to the request signal, may operate to obtain state of battery related information that ordinarily is communicated to the EV apparatus as part of a DC power charging communications cycle. The state of battery related information may include current state of charge of the battery, identifier of the battery or model or type of EV, and MAC address of the EV used to communicate state of battery related information when a DC power charging communications cycle is performed. The controller of the EV 16A may transmit the state of battery related information to the EV charging apparatus over the communication link therebetween. In one embodiment, the controller of the EV 16A may forward the state of battery related information directly to the controller 12, over the network 18. After the EV charging controller 14A or the controller 12 receives the state of battery related information, the controller 14A may control charging of the EV 16A such that charging of the EV 16A with AC power from the apparatus 14 starts, and optionally transmit a message signal to the EV 16A indicating that the DC charging communications cycle is terminated and an AC charging cycle is initiated. As evident, the EV 16A is not charged by DC charging according to an embodiment of the present disclosure in which state of battery related information is obtained in connection with actually performing AC charging of the battery. In addition, in block 606, information indicating supply of AC power to charge the EV 16A may be provided from the charging apparatus 14 to the controller 16, for use in determining a power charging function of the EV 16A.

The operations of the blocks 602, 604 and 606 may be repeated multiple times, at predetermined times or periodically such as described below, such that charging of the battery is periodically stopped and the state of battery related information as described above is obtained from the EV at the multiple times when charging with AC power is stopped.

In block 608, the controller 12 may determine a power charging function of the battery of the EV 16A, based on the state of battery related information. For example, based on a battery or EV identifier included in the state of battery related information, the controller 12 may acquire from the server 20, over the communication network 18, the power charging function of the battery. In an alternative embodiment, the battery or EV identifier may be provided by a user of the EV 16A, via a separate communication signal over the network 18, such from an app on the EV controller. In one embodiment, the power charging function may be determined based on sensor information received from the EV 16A indicating power consumption related characteristics or activities existing at the EV 16A such as, for example, the external environment, such as temperature outside the EV 16A, use of electrical devices of the EV 16A, such an air conditioning system of the EV, and the like.

In one embodiment, a rate of charging of the EV 16A for different predetermined battery charge states, for example, between 50-80% and between 90%-100% charged, may be determined using the power charging function.

In one embodiment, an EV or battery identifier may be determined based on power factor information obtained from monitoring charging operations at the EV charging apparatus, EV user charging activity including at least one of time or place or state of charge of the EV, or comparing the power charging function from the state of battery related information with other power charging functions identified respectively with EV or battery identifier indicated in power charging function information obtained from the server 22. The power factor information may indicate the extent that the load type is capacitive and inductive, and such information may be monitored by an energy meter at the EV charging apparatus, provided to the controller and used to determine the power charging function or correlated with power charging function information from the server 22 to determine the identifier for the EV.

In another embodiment, an EV or battery identifier may be determined by comparing a Media Access Control (MAC) address indicated in a response signal from the EV 16A with EV identifier information of a database correlating MAC addresses with EV identifier information obtained from the server 22.

In one embodiment, the controller 12 may determine an estimated total power requirement for the EV 16A based on the state of battery related information. In one embodiment, the controller 12 may determine charge capacity and time to complete charging for the EV 16A by supply of AC power at a predetermined rate, based on the power charging function for the EV 16A.

In one embodiment, the controller 12 may store in a memory the power charging function determined for a particular EV, with or without an identifier of the battery or particular EV associated with the power charging function. In a case the function is stored without the identifier, after power charging functions for other EVs have been determined and stored without an associated identifier, based on multiple stored power charging functions, an EV or battery identifier may be determined for the functions by correlating the power charging functions with battery charging specifications provided by battery or EV manufacturers.

It is to be understood that the functions of blocks 602, 604, 606 and 608 may be performed for a plurality of EVs that are charging or expected to be charge by EV apparatuses of the microgrid 11, which obtain energy for charging by AC power, or in some embodiments DC power also, from the grid and/or power sources 18.

In block 610, the controller 12 may determine, based on the state of battery related information, a power charging schedule for the EV 16A, and also for other EVs being or to be charged from the apparatus 14 on the microgrid 11. For example, the power charging schedule for the EV 16A may be determined from a given current state of charge indicated in the state of charge related information at a given time or a state of charge for the EV 16A which is determined from battery or EV identification information corresponding to EV 16A.

In one embodiment, power charging schedules for respective EVs may be determined to optimize distribution of energy from an energy source, e.g., the grid or source 18, used to supply the AC power for charging the EVs, such that the overload of the grid may be avoided and cost of charging may be minimized by scheduling EV charging.

In one embodiment, the controller 12, based on the power charging functions and current state of battery charge for multiple EVs obtained from the state of battery charge related information therefrom, may schedule charging of the EVs during times that the grid currently has or is predicted to have excess energy available, such as during an inversion event. In such embodiment, the charging of the EVs may be with AC power and/or DC power as available for charging at an EV charging apparatus. In a further embodiment, the controller 12 may control, when auxiliary energy storage on the microgrid 11 is available, storing at least a portion of the excess energy in a power storage 18 during the inversion event, and schedule charging of one or more EVs from the power storage at a time during or after a time of the inversion. 24. In another embodiment, the controller 12 may determine a power charging schedule which delays charging of an EV from the microgrid 11 at a scheduled time before the inversion is predicted to occur to another scheduled time during or after the inversion and at which the EV would be charged using energy from the storage 18.

In another embodiment, the controller 12 may determine power charging schedules based on the state of battery related information to provide for use of stored energy when there is high demand on the grid, and when information from the server 20 indicates times when there is likely to be power available for charging from the grid or sources 18.

In one embodiment, the power charging schedules for multiple EVs 16 may be determined by prioritizing charging of a first EV according to priority condition information including, for example, a predetermined minimum state of charge threshold below which an EV is indicated for priority for charging, and whether an EV user is registered with the controller 12 for a premium charging service, which results in charging for the EV being scheduled without regard to state of charge of the EV or cost for charging and charging at times selectable by the EV user. In one embodiment, the priority condition information may be information from the server 20 indicating availability of an energy source, such as the grid, from which the AC power is supplied, and may be a highly weighted factor in determining priority, or cause other factors, such as a subscription to a premium charging service, to not be considered when scheduling the charging of the EV, such as when the grid is in or expected to be in an overload state. It is to be understood that any number of conditions or factors related to energy availability or cost of charging, such as transactional energy information, may be used to determine a power charging schedule in combination with the state of battery related information, including the power charging function for specific EVs.

In one embodiment, the controller 12 may adjust an existing power charging schedule for an EV based on a change to a status of one or more of priority condition information.

In one embodiment, the controller 12 may adjust an existing power charging schedule to reduce a rate of supply of AC power to charge an EV when, at a predetermined time, a given current state of charge as indicated by the state of battery related information is above a threshold or a cost to supply the AC power is above a cost threshold indicated by user preference for the EV.

In one embodiment, the controller 12 may, based on the power charging functions and also current state of charge information determined from the state of battery related information obtained from respective EVs, determine power charging schedules for charging the EVs such that the EVs are charged using available energy from the microgrid by the charging apparatuses with AC power in an order starting from an EV whose battery has a lowest level of charge, and in one embodiment, a level of charge below a predetermined threshold.

In accordance with an aspect of the disclosure, a controller 12 may use state of battery related information, including current state of charging, and power charging functions for a plurality of EVs to control energy distribution from the grid and also alternative power sources 18 of a microgrid, and generate EV specific pricing information for charging the respective EVs from the charging apparatus of the microgrid. The EV specific pricing information may further be determined based on one or more of information indicating availability of local energy storage or renewable energy at the sources 18, pricing for energy supply from the grid obtained from the server 20, availability for energy supply from the grid obtained from the server 20, learned patterns of charging for EVs, for example, stored at the controller 12 or server 22, and energy available at an EV for storage at the storage source. Desirably, the EV specific pricing information may be determined to provide that available energy is distributed optimally from available resources for charging the EVs. For example, the information on available energy may be from sensor information associated with consumption devices 25, such as IoT sensors, a meter 13 monitoring supply of energy from the grid, or meter 18a monitoring supply of energy to the microgrid or storage at a storage source of energy from the microgrid or energy generated from an alternative power resource or DER 18.

In accordance with another aspect of the disclosure, the controller 12 may control charging of a plurality of EVs by supplying, over the network 18, to those EVs detected as connected to EV charging apparatuses of the microgrid 11, cost information for charging the EVs by the EV charging apparatuses using energy from the microgrid. The cost information, for example, may indicate a change to the cost for charging at the current time or a future time, and include a plurality pricing schedules indicating costs for charging at respective different times. The EV user, based on the cost information, may take certain actions, such as stopping, starting or continuing charging from the EV charging apparatus. The EV charging controller may transmit to the controller 12, via the network 18, information indicating the user charging activities identified with respective times at which the activities are occurred, where the activities are subsequent to receipt of the cost information at the EV. The controller 12 may, based on the user charging activity information, determine user charging preferences for respective EVs, and in particular determine a charging schedule for one or more of the EVs based on the respective user charging preference.

In an exemplary implementation of the technology of the present disclosure, an EV which is configured without intelligent communication capabilities in connection with AC charging, may be connected with a power interface of an EV charging apparatus on the microgrid 11 so as to be charged by the EV charging apparatus. At this time, the controller 12, based on information received over the network transmitted from the EV charging controller indicating detection of a connection to its power interface by the EV, may initiate a DC charging communications cycle session for the EV and cause the EV charging controller to transmit a request signal to the EV controller indicating DC mode of operation. The EV controller, based on the indication of DC mode of operation, may obtain state of battery related information typically provided to an EV charging controller during a DC charging cycle, and transmit such information to the EV charging controller. The controller 12, receiving the state of battery related information from the EV charging controller over the network 18, may transmit to the EV charging controller an instruction to terminate the DC charging communications cycle session and perform AC charging according to an AC power charging cycle. The controller 12 may then periodically cause stopping of AC power charging by the charging apparatus, and transmitting another request signal to the EV controller indicating initiation of DC mode of operation, to obtain state of battery related information at different times. In addition, the controller 12 may, based on the current state information and EV or battery identification information determined from the state of battery related information, determine a power charging function for the EV. Further, the controller 12 may, based on the power charging function and a given current state of charge for the EV, determine and adjust, as suitable, a power charging schedule for the EV, where the schedule may be determined from any other energy related information including cost, energy consumption and current or predicted energy availability determined from meters or sensors associated with the microgrid or from servers collecting such information, as suitable. Desirably, power charging schedules for respective EVs may be determined by performing the above-described operations, so as to optimize energy distribution from the grid or alternative energy sources on the microgrid, and charge EVs according to convenience and preference of the EV user while managing changing load conditions on the grid, such as during an overload or an inversion event.

Most of the foregoing alternative examples are not mutually exclusive, but may be implemented in various combinations to achieve unique advantages. As these and other variations and combinations of the features discussed above may be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings may identify the same or similar elements.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

What is claimed:

1. A method for charging a first electric vehicle (EV) using alternating current (AC) power from a power grid, the method comprising:
controlling, by a processing device,
periodically stopping an AC charging cycle of the first EV based on load information of the power grid; and
upon stopping the AC charging cycle, initiating a direct current (DC) power charging communications cycle for the EV based on the load information of the power grid, in which the initiating the DC power charging communications cycle includes obtaining a first state of battery related information for a first battery of the first EV by transmitting, over a communication link or interface, a request signal to a charging control device of the first EV indicating a DC power charging mode of operation.

2. The method of claim 1, further comprising:
controlling, by the processing device, determining a power charging function of the first battery based on the first state of battery related information.

3. The method of claim 2, further comprising:
controlling, by the processing device, receiving sensor information indicating power consumption by the first battery, wherein the power charging function for the first battery is determined based on the sensor information.

4. The method of claim 2, further comprising:
controlling, by the processing device, determining a first EV identifier or a first battery identifier for the first battery based on the power charging function of the first battery.

5. The method of claim 2, wherein the power charging function indicates a rate of charging the first EV by AC power between first and second times corresponding respectively to first and second state of charge data included in the first state of battery related information and corresponding to a given current state of charge of the first battery respectively at the first and second times.

6. The method of claim 1 further comprising:
controlling, by the processing device,
at least one of (i) monitoring power factor on an EV charging apparatus supplying the AC power to charge the first EV to obtain power factor information, or (ii) monitoring EV user charging activity including at least one of time or place of charging of the first EV to obtain user charging activity information; and
determining a first EV identifier or a first battery identifier for the first EV based on at least one of the power factor information, the first state of battery related information, the EV user charging activity information or a Media Access Control (MAC) address indicated in a response signal from the control device of first EV to the request signal.

7. The method of claim 1 further comprising:
controlling, by the processing device,
determining a first power charging function of the first battery based on the first state of battery related information, and second power charging functions of respective second batteries installed in second EVs based on second state of battery related information obtained for the respective second batteries when charging with AC power is periodically stopped; and
determining an EV identifier or a battery identifier corresponding to at least one of the first power charging function or the second power charging functions.

8. The method of claim 7 further comprising:
controlling, by the processing device, determining, based on the first state of battery related information and the second state of battery related information, a power charging schedule for each of the first EV and the second EVs,
in which the power charging schedules are determined such that distribution of energy from at least one energy source used to supply the AC power for charging the respective second batteries and the first battery is in accordance with predetermined criteria for managing load on a grid and minimizing cost of charging.

9. The method of claim 8, in which each of the first battery and the respective second batteries are being charged or scheduled to be charged using AC power from a same AC power source.

10. The method of claim 8, wherein the power charging schedules are determined based on at least one of availability information or cost information for supply of AC power for charging from the power grid or another AC power source,
in which the availability information indicates a limit of AC power available for supply from a power grid, an alternative power resource or storage.

11. The method of claim 1,
wherein the first state of battery related information indicates at least one of a current state of charge of the first battery or an electric vehicle (EV) or battery identifier for the first battery.

12. The method of claim 1, further comprising:
controlling, by the processing device, determining an estimated total power requirement of the first battery based on the first state of battery related information.

13. The method of claim 1, further comprising:
controlling, by the processing device, determining a power charging schedule for the first battery based on a power charging function of the first battery determined from the first state of battery related information.

14. The method of claim 1, wherein the processing device is at an AC charger supplying the AC power to charge the first battery.

15. The method of claim 1, further comprising:
controlling, by the processing device, determining a power charging schedule for the first battery based on a given current state of charge indicated in the state of battery related information associated with a given time or a determined state of charge determined from battery or electric vehicle (EV) identification information corresponding to the first battery.

16. The method of claim 15, wherein the power charging schedule is based on prioritizing charging the first battery according to at least one predetermined priority condition, in which the at least one predetermined priority condition includes at least one of a predetermined minimum state of charge threshold, a premium charging service being selected, or availability of an energy source from which the AC power is supplied to charge the first battery.

17. The method of claim 16, wherein the power charging schedule is adjusted based on a change to a status of the at least one predetermined priority condition.

18. The method of claim 15, wherein the power charging schedule is adjusted to reduce a rate of supply of AC power to charge the first battery when, at a predetermined time, at least one of the given current state of charge is above a threshold or a cost to supply the AC power is above a second threshold.

19. The method of claim 1, further comprising:
controlling, by the processing device, storing in a database the power charging function for the first battery identified by an EV identifier or a battery identifier corresponding to the first battery.

20. The method of claim 1, wherein the power charging function of the first battery is determined based on current state of battery information or electric vehicle (EV) or battery identification information corresponding to the first battery provided by user input over a communication network.

* * * * *